US006238475B1

(12) United States Patent
Gargulak et al.

(10) Patent No.: US 6,238,475 B1
(45) Date of Patent: May 29, 2001

(54) AMMOXIDIZED LIGNOSULFONATE CEMENT DISPERSANT

(75) Inventors: Jerry D. Gargulak, Weston; Lori L. Bushar; Ashoke K. Sengupta, both of Mosinee, all of WI (US)

(73) Assignee: LignoTech USA, Inc., Rothschild, WI (US)

( * ) Notice: Subject to any disclaimer, the term of this patent is extended or adjusted under 35 U.S.C. 154(b) by 0 days.

(21) Appl. No.: 09/296,093

(22) Filed: Apr. 21, 1999

(51) Int. Cl.$^7$ .............................. C04B 24/00; C04B 24/18
(52) U.S. Cl. ......................... 106/725; 106/727; 106/808
(58) Field of Search ............................... 106/696, 725, 106/727, 738, 808

(56) References Cited

U.S. PATENT DOCUMENTS

| | | | |
|---|---|---|---|
| 4,017,419 | * | 4/1977 | Ludwig et al. ........................ 516/43 |
| 4,562,236 | * | 12/1985 | Lin ..................................... 527/400 |
| 4,775,744 | * | 10/1988 | Schilling et al. ..................... 530/501 |
| 4,781,840 | | 11/1988 | Schilling et al. ..................... 210/730 |
| 4,977,227 | | 12/1990 | Negami et al. ...................... 527/400 |
| 4,990,191 | | 2/1991 | Schilling .............................. 106/805 |
| 5,028,271 | * | 7/1991 | Huddleston et al. ................. 106/720 |
| 5,720,792 | | 2/1998 | Fischer et al. .......................... 71/11 |
| 6,068,055 | * | 5/2000 | Chatterji et al. ..................... 166/292 |
| 6,077,888 | * | 6/2000 | Schilling .............................. 524/76 |

FOREIGN PATENT DOCUMENTS 2092564   2/1981  (GB) .

* cited by examiner

*Primary Examiner*—Elizabeth D. Wood
(74) *Attorney, Agent, or Firm*—Andrus, Sceales, Starke & Sawall, LLP

(57) ABSTRACT

A modification to lignosulfonate is disclosed, the effect of which is to reduce the set retarding and air entraining properties normally experienced when using lignosulfonates as water reducing admixtures in cement compositions. The modified lignosulfonate is obtained by oxidative reaction of a lignosulfonate or one of its salts with ammonia or other amine in an aqueous solution.

8 Claims, No Drawings

AMMOXIDIZED LIGNOSULFONATE CEMENT DISPERSANT

BACKGROUND OF THE INVENTION

1. Field of the Invention

This invention relates generally to water reducing chemical admixtures for concrete, and particularly to lignin based additives used wholly as, or as a component in, a water reducing chemical admixture.

2. Description of the Related Art

In the construction industry water reducing admixtures are used, in general, to increase the strength of fresh concrete by lessening the amount of water required to achieve a certain fluidity. They are also used to increase the fluidity of fresh concrete, and make concrete of equal strength less costly by removal of a portion of the cement.

Lignosulfonate is a common cement dispersant. A large portion of the world's production of lignosulfonate is used as water reducing admixtures to increase the strength of concrete in various construction applications. When used in cement compositions lignosulfonate reduces the amount of water required, and improves the workability of the cement. Lignosulfonate, however, has several negative consequences associated with its use, including retarding the set of fresh concrete and increasing the amount of entrapped air present in concrete. The former is undesirable because delayed setting slows production rates, and the latter is undesirable because of decreased strength of the set concrete.

Typically, these shortcomings of lignosulfonate encountered during their use in cement compositions are mitigated through formulation of the admixture. For example, accelerators are added to admixture products to offset the retarding effect. The reagents commonly used as accelerators include the calcium salts of chloride, nitrate, nitrite, formate and thiocyanate. Inherently, however, these materials add cost to the admixture. Another common formulation practice involves the use of defoamers. Various defoamer products have been used with some success to lower the entrapped air caused by lignosulfonate. Unfortunately, these defoamers have a negative impact on air entraining admixtures that are employed to improve the freeze-thaw durability of concrete. Therefore, addition of defoamers is not an accepted practice where freeze-thaw durability is required.

In the construction industry various synthetic dispersants are employed that do not suffer from the above-listed drawbacks associated with lignosulfonates. Polynaphthalene sulfonate, melamine resin, and carboxylic polymers are, generally, the three classes of anionic dispersants used for this application. These materials tend not to retard the set of concrete, and to result in only low quantities of entrapped air. However, they are derived from petroleum resources, and are much more costly than lignosulfonate. It would be desirable to have a cement dispersant without the negative side effects of set retardation and air entrainment, but derived from an environmentally benign, readily available, and relatively inexpensive source. Lignosulfonate, which is produced in large quantities as a byproduct of the pulp and paper industry, has the potential to be such a dispersant, if it can be suitably modified to overcome its shortcomings in cement compositions.

In attempts to minimize the set-retarding and air-entraining effects of lignosulfonate, some modifications to lignosulfonate that have been employed in the past include:

1. Alkali air oxidation (Japanese Kokai Sho-No. 55-56051)
2. Ultrafiltration (GB No. 2092564)
3. Polymerization of lignosulfonate to increase molecular weight (Japanese Kokoku Sho-No. 58-176158)
4. Co-polymerization of lignin and lignosulfonate with various vinylic monomers (U.S. Pat. No. 4,977,227)

Generally, these modifications have been found either to have a minimal impact on the final performance of the lignosulfonate, or to be cost prohibitive.

It has been shown that the addition of nitrogen functionality to lignosulfonate will decrease the setting time of various cement compositions, as disclosed in the U.S. Pat. No. 4,990,191. In this patent, the method of nitrogen incorporation is through the reaction of lignosulfonate with a polyamine and an aldehyde, also known as the Mannich condensation (U.S. Pat. No. 4,781,840).

Yet another already disclosed method for introducing nitrogen functionality in lignin and lignosulfonate utilizes a reaction with ammonia and an oxidant, preferably air or oxygen-containing gas mixtures. The process is known as ammoxidation, and the use of ammoxidized lignosulfonate has been disclosed for slow nitrogen release fertilizers. U.S. Pat. No. 5,720,792 discloses the latest embodiment of this technology.

SUMMARY OF THE INVENTION

A use for lignosulfonate that has been modified by oxidative ammonolysis is disclosed. The effect of such chemical modification is to reduce the retarding and air-entraining properties normally experienced when using lignosulfonates as water reducing admixtures. The modified lignosulfonate is obtained by oxidative reaction of lignosulfonate with ammonia or other amine in an aqueous solution, a process commonly described in literature as "ammoxidation". An outcome of this process is the incorporation of a certain portion of free nitrogen into the sulfonated lignin polymer as amide, nitrile and/or amine functional groups. Typical incorporation rates range from 0.5 to 60%. Depending on conditions of the reaction and the chemical make-up of the lignosulfonate treated, sulfonate sulfur content may remain constant, or decrease. Molecular weight may also increase or decrease, depending on reaction conditions.

When used as a dispersant in a cement or mortar composition, the ammoxidized lignosulfonate shows substantially less retardation and entrapped air than the lignosulfonate from which the ammoxidized material was derived. Other potential dispersion applications for this technology include, but are not limited to, carbon black, clays, mineral slurries, and pigments.

The application of ammoxidation to chemically modify lignosulfonate in order to produce cement dispersants that have reduced set-retarding and air-entraining effects on fresh concrete has not heretofore been attempted.

Accordingly, it is the primary objective of the invention to provide novel dispersants produced from ammoxidized lignosulfonates.

It is a more specific object of the invention to provide such dispersants that exhibit an optimal balance of properties, rendering them highly suited for use as dispersants for cement in concrete.

Another specific object of the invention is to provide ammoxidized lignosulfonates that exhibit relatively low retardation and air entrapment in cement used in concrete and/or mortar compositions.

Still another object of the invention is to provide novel dispersants of the foregoing type, which are relatively inexpensive and simple to produce.

DETAILED DESCRIPTION OF THE INVENTION

As used herein, the term "lignin" has its normal connotation, and refers to the substance which is typically recovered from the organosolve process, or from alkaline black pulping liquors such as are produced in the Kraft, soda, and other well known alkaline pulping operations. The term "sulfonated lignin", as used in this specification, refers to the product which is obtained by the introduction of sulfonic acid groups into the lignin molecule, as may be accomplished by the reaction of lignin with sulfite or bisulfite compounds. For example, the waste liquors from such organosolve or alkaline pulping contain large quantities of lignin and lignin decomposition products, which can be sulfonated or sulfomethylated by known processes, such as high temperature sulfonation, oxidative sulfonation at ambient temperature, or sulfomethylation by reaction of lignin, sodium sulfite and formaldehyde. As used herein, the term "sulfite lignin" refers to the reaction product of lignin, which is inherently obtained during sulfite pulping of wood, straw, corn stalks, bagasse and the like, and is a principle constituent of the spent sulfite liquor which is derived from that process. Finally, the phrase "lignosulfonate" encompasses not only the sulfonated lignin and sulfite lignin reaction products described above, but also spent sulfite liquors that may be further reacted, purified, fractionated, or the like, as may be required to produce the lignosulfonate material of interest. The lignosulfonates may be utilized in the "as is" or whole liquor condition. They may also be utilized as a purified lignosulfonate material from, or in which the sugars and other saccharide constituents have been removed and/or destroyed, or additionally inorganic constituents have been partially or fully eliminated. Any type of lignosulfonate that is hardwood, softwood, crude, or pure may be employed, and these lignosulfonates may also be utilized in their salt form. For example, calcium lignosulfonates, sodium lignosulfonates, ammonium lignosulfonates, potassium lignosulfonates, magnesium lignosulfonates and mixtures or blends thereof may be utilized herein. Lignosulfonates are available from numerous sources in either aqueous solution or dried power forms. For example, LignoTech USA, Inc. sells lignosulfonates under the trade designations Lignosol, Norlig, and Marasperse which are appropriate for use in the present invention.

Lignosulfonate to be used in preparing the ammoxidized material may be obtained from any number of commercial sources. Some typical lignosulfonates that may be used in this reaction are included in the following list: Calcium lignosulfonate, such as Norlig A, Borresperse CA or Lignosite CX (manufactured by Georgia Pacific Corporation); Sodium lignosulfonate, such as Norlig 42C, Borresperse NA or Lignosite 458 (manufactured by Georgia Pacific Corporation); Purified sodium lignosulfonate such as Ultrazine NA; Purified calcium lignosulfonate such as Ultrazine CA: Sulfonated sodium lignosulfonate such as Marasperse AG; and Ammonium lignosulfonate such as Tembind S004 made by Temfiber, Inc. Cationic salts of lignosulfonate in the form of calcium, sodium, ammonium, magnesium, and potassium salts may be utilized, but those preferred are ammonium, sodium and calcium.

Oxidizing agents such as oxygen, air, hydrogen peroxide and ozone are considered as acceptable oxidants.

The amines that may be reacted with lignosulfonate include ammonia, and other primary and secondary alkyl amines such as pentaethylenehexamine, hexamethyleneamines and the like. In particular, organic amines that may be reacted with lignosulfonate are primary amines such as methylamine, ethylamine, ethylenediamine, benzylamine or aniline, secondary amines such as dimethylamine, diethylamine, diisobutylamine, methylphenylamine and ethylbenzylamine, and tertiary amines like trimethylamine, triethylamine or tributylamine.

Generally, the ammoxidation reaction is carried out by dissolving the lignosulfonate in water to a solids level of 10 to 60%, more preferably 20 to 50%, and most preferably to a level of 30%, adjusting the pH to 6–10, adding the desired amine and oxidant, and heating for 0.25 to 20 hours at 90–180° C. The reaction is most easily carried out in a pressure reactor. Lignosulfonate used for this process may be any of the materials previously described.

The amount of oxidant used is between 0.01 to 2 moles per 100 g lignosulfonate, more preferably between 0.15 to 0.35 moles per 100 g lignosulfonate. The lignosulfonate can optionally be treated with oxidizing agents such as hydrogen peroxide and the like prior to, or after, ammoxidation to further increase its performance as a dispersant if desired.

The dosage of ammoxidized material of this invention in concrete compositions is from 0.05 to 3% solids with respect to the weight of the cement. This yields a concrete composition with a high degree of flowability. Retardation and air entrapment are reduced compared to a similar dosage of technical unmodified lignosulfonates. The ammoxidized material is generally added to the concrete composition at the time of mixing the composition materials. However, the ammoxidized material may be added after the mixing of the concrete composition, or before the concrete compositions are placed at the construction site.

Cement is a material that binds together solid bodies such as sand and gravel (aggregate) by hardening from a plastic state. An inorganic cement, used for construction, functions by forming a plastic paste when mixed with water and develops rigidity (sets) and then steadily increases in compressive strength (hardens) by chemical reaction with the water (hydration). The type of cements that this process would work with include, but are not limited to, Portland cements, combined Portland cements, Pozzolanic cements, white cements and oil well cements.

Concrete is a composite material made with cement, water, and aggregates such as sand and gravel. A typical example of how these materials are proportioned for concrete are 2:1:5:7. This may vary widely depending on a number of factors, including strength, cost and other specifications. Upon hydration of this mixture concrete is formed. A typical concrete composition comprises from about 5% to 25% by weight cement, from about 3% to 12% by weight water, and from about 70% to 90% by weight aggregate. The cement dispersant described herein is added to such a concrete composition in amounts of from about 0.05% to 3% by weight based on the weight of the cement.

The practice of this invention may be seen in the following examples wherein various types of ammoxidized lignosulfonate and the improvement in performance properties over those of their unmodified counterparts are described. In the following examples, the mortar used for testing comprised a mixture of cement, water and sand mixed in the following proportions: cement:water:sand 1:2.4:7.

EXAMPLE 1

Into 232 g of a hardwood lignosulfonate, Norlig 24C liquid containing 49.4% solids, are added 185 g of water and 8.2 g of a 28% (w) solution of ammonium hydroxide. The pH of the solution is 8.2 after it is stirred thoroughly. This solution is then charged into a Parr reactor and heated at 165° C. for one hour under 200 psi oxygen pressure. The product prepared according to this scheme shows much less set retardation and entrapped-air than Norlig 24C, when tested in mortar, as shown by the data in Table 1.

EXAMPLE 2

Into 251 g of water is slurried 106 g of a highly sulfonated lignosulfonate, Marasperse AG, powder containing 94.4% solids. The lignosulfonate solution thus prepared receives the same dosage of a 28% (w) solution of ammonium hydroxide as in Example 1. The resulting solution at pH 10.5 is charged into a Parr reactor and heated at 165° C. for one hour under 200 psi oxygen pressure. The product is found to be significantly less retarding and air-entraining as compared to Marasperse AG, as shown by the data in Table 1.

EXAMPLE 3

Into 247 g of a ultrafiltered softwood lignosulfonate, Ultrazine CA liquid containing 40.6% solids, are added 103 g of water, 16 g of a 30% (w) solution of sodium hydroxide, and 7.2 g of a 28% (w) solution of ammonium hydroxide. The resulting solution is charged into a Parr reactor and heated at 165° C. for one hour under 200 psi oxygen pressure. In mortar, the data in Table 1 show the product results in set retardation and entrapped-air that are considerably lower than the same found with Ultrazine CA.

EXAMPLE 4

Into 500 g of a softwood ammonium lignosulfonate, Norlig P, liquid containing 50.2% solids, are added 418 g of water and 35.0 grams hydrated lime. The pH of the solution is 10.2 after it is stirred thoroughly. This solution is then charged into a Parr reactor and heated at 165° C. for two hours under 200 psi oxygen pressure. The data in Table 1 show the product prepared according to this scheme shows much less set retardation and entrapped-air than Norlig P, when tested in mortar. Analysis of final material: pH 7.0, Mw 105,200, 1.14% displaceable nitrogen, 1.8% fixed nitrogen. This example illustrates that the source of ammonia may be from the base of ammonium lignosulfonate.

EXAMPLE 5

In this example, a softwood lignosulfonate, Lignosite 50, is treated with hydrogen peroxide prior to ammoxidation to produce a high performing cement dispersant. Into 200 g of Lignosite 50 solution containing 50% solids are added 122 g of water and 16 g of a 50% (w) solution of sodium hydroxide. Subsequently, the mixture is heated to 550° C. under constant stirring. Into this pre-heated solution is added 20 gm of a 30% (w) solution of hydrogen peroxide in small portions while stirring is continued. Once the addition of hydrogen peroxide is complete, 7.2 g of a 28% (w) solution of ammonium hydroxide is added to the hydrogen peroxide-treated lignosulfonate solution. This final reaction solution is charged into a Parr reactor and heated at 165° C. for one hour under 200 psi oxygen pressure. The data in Table 1 show this product has much less set retardation and entrapped-air than Lignosite 50.

A brief description of the mortar tests that were carried out on these samples for determining their performance properties is given below.

The cement:sand:water ratio used in the mortar tests is 1:3:0.41, while the dispersant dosage is 0.3% on the weight of the cement. The cement dispersing ability of the ammoxidized samples is determined by following a procedure described in ASTM C87, that uses a flow table such as the one described in ASTM C230. The "set time" is determined by monitoring the transient variation of temperature of a mass of mortar taken in an insulated plastic cup, using a thermocouple probe. As the mortar mass undergoes the initial set, the liberated heat of hydration of cement causes a sharp rise in temperature of the mortar mass. The time at which the temperature vs. time plot (obtained by joining the data points with straight lines) shows a change in slope is taken as the "set time". A gravimetric method, ASTM C138, is used in determining the air content of the mortar.

TABLE 1

PERFORMANCE DATA FOR VARIOUS AMMOXIDIZED SAMPLES

| Sample ID | Flow, cm | % Air | Set Time, hrs. |
|---|---|---|---|
| Example 1 | 19 | 16.4 | 6.9 |
| Norlig 24C | 22 | 24.4 | 10 |
| Example 2 | 18.4 | 13 | 5.2 |
| Marasperse AG | 19.5 | 17.3 | 8.7 |
| Example 3 | 17.7 | 15.7 | 5.9 |
| Ultrazine CA | 21.1 | 25.8 | 8.6 |
| Example 4 | 21.4 | 17.4 | 9.5 |
| Norlig P | 21.4 | 19.4 | 20 |
| Example 5 | 17.2 | 15.2 | 5.8 |
| Lignosite 50 | 20.1 | 16.9 | 10.1 |
| Water (control) | 14.7 | 11.5 | 4 |

TABLE 2

ANALYTICAL DATA ON VARIOUS LIGNOSULFONATES BEFORE AND AFTER AMMOXIDATION

| Sample ID | Mol. Wt. | | Sulfonate Sulfur, % | | Bound Nitrogen, % | | Methoxyl, % | |
|---|---|---|---|---|---|---|---|---|
| | Before | After | Before | After | Before | After | Before | After |
| Marasperse AG | 14,706 | 49,300 | 8.5 | 5.7 | 0 | 0.77 | 5.8 | 6.22 |
| Borresperse NA | 50,100 | 104,400 | 6.7 | 3.32 | 0 | 0.59 | 8.3 | 9.24 |
| Norlig 612 | 21,500 | 71,900 | 7.1 | 3.54 | 0 | 1.06 | 8.3 | 6.83 |
| Norlig 24C | 19,000 | 48,000 | 5.3 | 4.7 | 0 | 0.56 | 9.4 | 9.7 |
| Maracell XE | 5,000 | 74,200 | 2.5 | 1.69 | 0 | 0.63 | 5.9 | 6.35 |

We claim:

1. A concrete composition comprising:
   (a) from about 5% to 25% by weight cement;
   (b) from about 3% to 12% by weight water;
   (c) from about 70% to 90% by weight aggregate; and
   (d) from about 0.5% to 3% by weight of a cement dispersant comprising an ammoxidated lignosulfonate produced by oxidative ammonolysis of a lignosulfonate or salt of a lignosulfonate which provides a reduction in set-retardation and air-entrapping properties of the lignosulfonate or salt of said lignosulfonate.

2. The concrete composition of claim 1 wherein said oxidative ammonolysis comprises reacting the lignosulfonate or salt of the lignosulfonate with an amine and an oxidizing agent under oxidizing conditions.

3. The concrete composition of claim 2 wherein said amine is selected from the group consisting of primary alkyl amines, secondary alkyl amines and tertiary alkyl amines.

4. The concrete composition of claim 2 wherein said amine is ammonia.

5. The concrete composition of claim 2 wherein said oxidizing agent is selected from the group consisting of oxygen, air, ozone and hydrogen peroxide.

6. The concrete composition of claim 1 wherein said lignosulfonate is selected from the group consisting of a sulfonated lignin and a sulfite lignin.

7. The concrete composition of claim 1 wherein said salt of the lignosulfonate is selected from the group consisting of calcium lignosulfonate, sodium lignosulfonate, ammonium lignosulfonate, magnesium lignosulfonate, and potassium lignosulfonate.

8. A method of minimizing entrapped air in a concrete composition compared to technical unmodified lignosulfonates, comprising adding to the concrete composition from about 0.05% to 3% by weight based on the weight of the cement of a cement dispersant comprising an ammoxidated lignosulfonate produced by oxidative ammonolysis of a lignosulfonate or salt of a lignosulfonate.

* * * * *